United States Patent
Kozakai

(12) 
(10) Patent No.: US 6,172,979 B1
(45) Date of Patent: Jan. 9, 2001

(54) CDV-REDUCING ALGORITHM CIRCUIT SELF-MONITORING SYSTEM

(75) Inventor: Rie Kozakai, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/985,064

(22) Filed: Dec. 4, 1997

(30) Foreign Application Priority Data

Dec. 4, 1996 (JP) .................................................. 8-323844

(51) Int. Cl.$^7$ .................................................. H04L 12/28
(52) U.S. Cl. .......................................... 370/395; 370/229
(58) Field of Search ................................... 370/229, 230, 370/232, 233, 235, 236, 397, 395, 231, 234, 392

(56) References Cited

U.S. PATENT DOCUMENTS

| | | | | |
|---|---|---|---|---|
| 5,274,641 | * | 12/1993 | Shobatake | 370/392 |
| 5,581,545 | * | 12/1996 | Morimoto | 370/237 |
| 5,668,797 | * | 9/1997 | Fahmi | 370/229 |
| 5,694,554 | * | 12/1997 | Kawabata . | |
| 5,751,695 | * | 5/1998 | Ohashi | 370/232 |

FOREIGN PATENT DOCUMENTS

| | | |
|---|---|---|
| 3-241944 | 10/1991 | (JP) . |
| 4-25255 | 1/1992 | (JP) . |
| 4-46432 | 2/1992 | (JP) . |
| 4-100451 | 4/1992 | (JP) . |
| 4-266240 | 9/1992 | (JP) . |
| 4-329733 | 11/1992 | (JP) . |
| 5-130125 | 5/1993 | (JP) . |
| 6-315034 | 11/1994 | (JP) . |
| 8-163150 | 6/1996 | (JP) . |

OTHER PUBLICATIONS

English translation of Japanese Office Action dated Apr. 16, 1999 (Hei 11).
Takado, Y. et al. "Error observatio Method of the (Leaky Bucket–phonetic) Algorithm in the UPC?NPC Device of the ATM Net", Comminication [2], 1995 Electronic Information Communication Society General Conference B–7311, Mar. 10, 1995, p. 177.

* cited by examiner

Primary Examiner—Douglas W. Olms
Assistant Examiner—Ricardo M. Pizarro
(74) Attorney, Agent, or Firm—McGuireWoods, LLP

(57) ABSTRACT

A CDV-reducing algorithm circuit self-monitoring system is operative for detecting a non-data cell contained in a cell flow and arriving at a predictable time, executing a CDV-reducing algorithm operation on the detected non-data cell using self-monitoring parameters, comparing the result of the reduced CDV algorithm operation and an estimated value, and determining, when the two compared data are equal, that the CDV-reducing algorithm is normal, while making, when the two compared data fail to be equal, a determination that the CDV-reducing algorithm is abnormal and also notification of an alarm to a function control system.

11 Claims, 6 Drawing Sheets

FIG. 3B

CELL INPUT/OUTPUT

| ARRIVAL CELL No. | 1 | 2 | 3 | 4 | 5 | 6 | 7 | 8 | 9 |
|---|---|---|---|---|---|---|---|---|---|
| EXPECTED OPERATION | PROTECT | PATTERN#1 | PROTECT | PATTERN#2 | PROTECT | PATTERN#3 | PROTECT | PATTERN#4 | PATTERN#5 |
| PERMISSIBLE RESIDUAL CDV VALUE $\tau s(i)$ | 20 | 20 | 20 | 20 | 20 | 20 | 20 | 20 | 20 |
| THEORETICAL CELL TRANSMISSION TIME TET(i) | 0 | 120 | 120 | 280 | 280 | 440 | 660 | 660 | 660 |
| CELL ARRIVAL TIME ta | 0 | 90 | 180 | 270 | 360 | 450 | 540 | 630 | 720 |
| IDEAL TRANSMISSION TIME to(i) | 0 | 100 | 180 | 270 | 360 | 450 | 640 | 640 | 720 |

FIG. 3C

OPERATION FOR NEXT CELL

| EXPECTED OPERATION AND INPUT PARAMETER Ts(i) FOR NEXT CELL ARRIVAL TIME | PATTERN#1 120 | PROTECT 0 | PATTERN#2 100 | PROTECT 0 | PATTERN#3 80 | PROTECT 210 | PATTERN#4 0 | PATTERN#5 0 | PROTECT 0 |
|---|---|---|---|---|---|---|---|---|---|
| STORAGE CONTENTS IN OPERATION MEMORY | 120 | 120 | 280 | 280 | 440 | 660 | 660 | 660 | 0 |

FIG.5
<USER CELL>
1 SHAPING  (to=TET-$\tau s$)
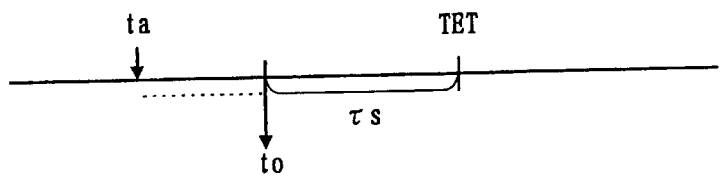
2 to=ta WITH UNCHANGED TET
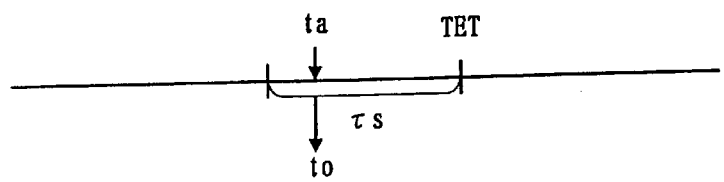
3 to=ta WITH new_TET
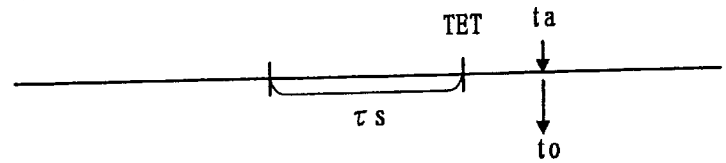
<NON-USER CELL>
4 BYPASS WITH to>ta
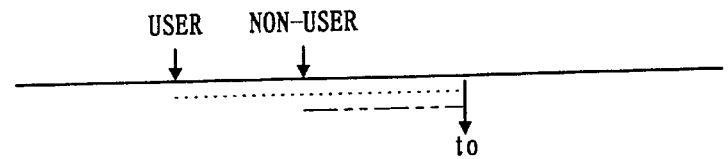
5 UPDATE (BYPASS) AS to=ta WITH to>ta
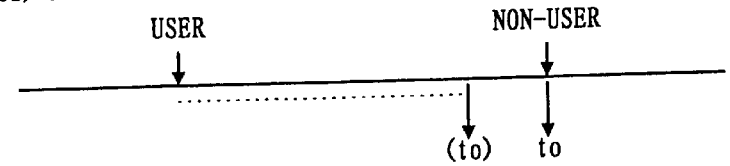

CDV-REDUCING ALGORITHM CIRCUIT SELF-MONITORING SYSTEM

BACKGROUND OF THE INVENTION

The present invention relates to (Cell Delay Variation) CDV-reducing algorithm circuit self-monitoring systems in shaping function systems.

It is well known in the art that an ATM network should have a commonly termed shaping function to alleviate a burst character causing reduction of its utility. The shaping function has resort to a CDV-reducing algorithm. CDV-reducing algorithms are realized by hardware logic circuits. Hereinunder, such a hardware logic circuit is referred to as CDV-reducing algorithm circuit.

In a CDV-reducing algorithm circuit, the transmission time, i.e., instant of transmission, of an input cell is determined from minimum inter-cell interval $T_s$, permissible residual CDV $\tau_s$, cell arrival time ta, theoretical next cell transmission time TET under shaping function, ideal cell transmission time $t_o$ derived from shaping and arrival time of a cell immediately proceeding the VP of the input cell, and written in a shaping buffer at a position thereof corresponding theretoto.

FIG. 4 is a flow chart illustrating a process in a CDV-reducing algorithm circuit. In a step 11, initial parameter data ($T_s$, $\tau_s$, TET=$t_a$ and $t_o$=$t_a$) are set. When the arrival of a cell at time $t_s$ is detected in a step 12, parameter data corresponding to VPI (VCI) is read out in a step 13, and then a step 14 is executed.

In the step 14, a check is made as to whether the detected arrival cell is a user's cell or a non-user's cell. In the case of a user's cell, a step 15 is executed, in which a check is made as to whether theoretical cell transmission time TET is greater than the sum of cell arrival time $t_s$ and permissible residual CDV $\tau_s$. In the case when the arrival cell is a non-user's cell, an operation which will be described late is brought about.

When the theoretical cell transmission time TET is not greater than the sum of the cell arrival time $t_a$ and the permissible residual CDV time $\tau_s$, a step 16 is executed, in which the theoretical cell transmission time TET is set to a predetermined time, i.e., max ($t_a$, TET). Then, in a step 17 an ideal cell transmission time $t_o$ is set to the cell arrival time $t_a$, and then a step 18 is executed.

When the theoretical cell transmission time TET is greater than the sum of the cell arrival time $t_s$ and the permissible residual CDV $\tau_s$, the routine goes to a step 19, in which the ideal cell transmission time to is set to the sum of the theoretical cell transmission time TET and the permissible residual CDV $\tau_s$, and then the step 18 is executed. In the step 18, the theoretical cell transmission time TET is updated by minimum cell time Ts.

When it is found in the step 14 that the arrival cell is a non-user's cell, the routine goes to a step 110, in which the time relation between the ideal cell transmission time $T_a$ and the cell arrival time $t_a$ is checked. When the cell arrival time $t_a$ is found to be later than the ideal cell transmission time $t_o$, a step 111 is executed, in which the ideal cell transmission time $t_o$ is set to the cell arrival time $t_a$, and then a step 112 is executed. When the cell arrival time $t_a$ is found to be earlier than the ideal cell transmission time $t_o$, a step 112 is executed. In the step 112, the ideal cell transmission time is set $t_o$, and the routine goes back to the step 12.

The CDV-reducing algorithm circuit as described above with reference to the flow chart of FIG. 4, has five different operation patterns #1 to #5 as shown in FIG. 5. These operation patterns #1 to #5 are labeled as #1 to #5 in the flow chart of FIG. 4.

The above CDV-reducing algorithm circuit can guarantee an ideal cell transmission interval to a certain extent.

However, when an abnormal operation result is produced, which is attributable to hardware of the CDV-reducing algorithm circuit, accurate shaping becomes impossible. Accordingly, it is necessary to provide a mechanism, which can detect an abnormality as soon as the occurrence thereof, and producing an alarm for early removal of the abnormality and restoration of the circuit. In addition, it is necessary to detect an abnormality without interrupting the shaping operation but in an in-service state of the circuit.

SUMMARY OF THE INVENTION

An object of the invention therefore is to provide a reduced CDV algorithm circuit self-monitoring system, which detects an abnormal operation attributable to hardware of a CDV-reducing algorithm circuit and provides an alarm as soon as the occurrence thereof.

According to the invention, there is provided a CDV-reducing algorithm circuit self-monitoring system operative for detecting a non-data cell contained in a cell flow and arriving at a predictable time, executing a CDV-reducing algorithm operation on the detected non-data cell using self-monitoring parameters, comparing the result of the reduced CDV algorithm operation and an estimated value, and determining, when the two compared data are equal, that the CDV-reducing algorithm is normal, while making, when the two compared data fail to be equal, a determination that the CDV-reducing algorithm is abnormal and also notification of an alarm to a function control system.

The non-data cell arrives periodically and the arrival time instant of the non-data cell is measurale on the basis of a certain function.

According to another aspect of the present invention, there is provided a CDV-reducing algorithm circuit self-monitoring system for a CDV-reducing algorithm circuit having five different operation patterns, i.e., one of shaping in which $t_o$ is set to $t_o$=TET−$\tau_s$, one in which $t_o$ is set to $t_o$=$t_a$ with TET unchanged, one in which $t_o$ is set to $t_o$=$t_a$ with new TET, one in which a bypass executed under $t_o$>$t_a$, and one in which an update or a baypass is executed such that $t_o$=$t_s$ under $t_o$<$t_a$, the CDV-reducing algorithm circuit self-monitoring system being operative for defining a self-monitoring pattern $t_o$(k) (k being 0, . . . 4), executing a normal policing operation on an arrival cell other than periodic cells and, upon detection of a periodic cell, reading out $t_o$(i) and predetermined self-monitoring parameter data TET (TET(i)) for k=i to make a theoretical value as a CVD-reducing algorithm operation result equal to $t_o$(i), executing a CDV-reducing algorithm operation by using TET(i) in lieu of TET at the theoretical periodic cell transmission time, comparing the operation result $t_o$ and $t_o$(i), and determining, when the two compared data are equal, that the CDV-reducing algorithm is normal, while making, when the two compared data fail to be equal, a determination that the CDV-reducing algorithm is abnormal and also notification of an alarm to a function control system.

According to further aspect of the present invention, there is provided a CDV-reducing algorithm circuit self-monitoring apparatus comprising means for detecting non-data cells contained in a cell flow and arriving at predictable times, means for a CDV-reducing algorithm operation on each detected non-data cell by using self-monitoring parameters, means for comparing the result of the CDV-reducing algorithm operation and an estimated value and determining, when the two compared data are equal, that the CDV-reducing algorithm is normal, while making, when the two compared data fail to be equal, a determination that the CDV-reducing algorithm is abnormal and also making notification of an alarm to a function control system.

Other objects and features will be clarified from the following description with reference to attached drawings.

BRIEF DESCRIPTION OF THE DRAWINGS

FIGS. 3A–3C show drawings for explaining an absolute time control method with ta=0, . . . 720 as one cycle;

FIG. 5 shows five different operation patterns of CDV-reducing algorithm.

PREFERRED EMBODIMENTS OF THE INVENTION

Figure 1:
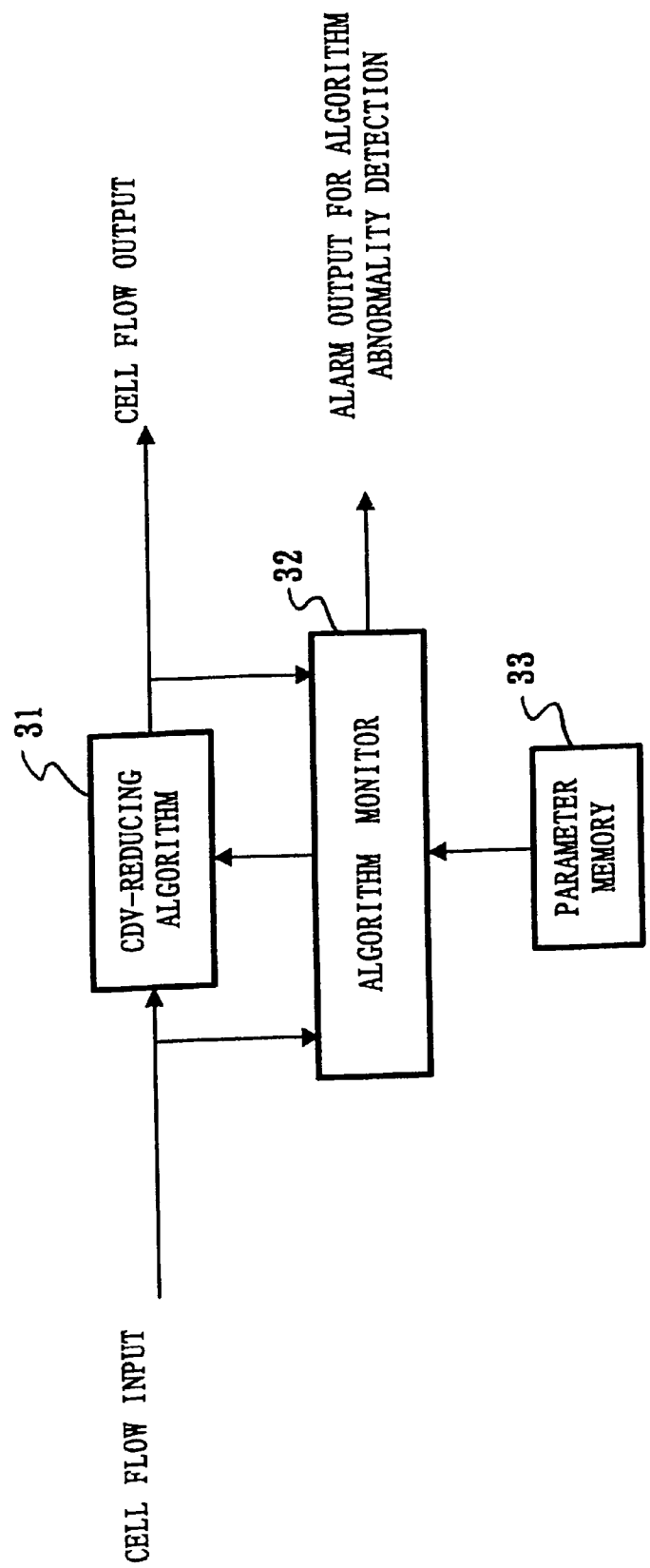
FIG. 1 is a block diagram showing the construction of an embodiment of the CDV-reducing algorithm circuit self-monitoring system according to the invention.

Preferred embodiments of he invention will now be described with reference to the drawings. FIG. 1 is a block diagram showing the construction of an embodiment of the CDV-reducing algorithm circuit self-monitoring system according to the invention. When a cell flow contains data cells which are periodical ones or ones arriving at times which can be estimated on the basis of a certain function, such cells are referred to as periodic cells.

The illustrated CDV-reducing algorithm circuit self-monitoring system comprises a CDV-reducing algorithm circuit (shown as "CDV-REDUCING ALGORITHM") 31, an algorithm monitor 32, and a parameter memory 33. Upon detection of a periodic cell, the algorithm monitor 32 causes self-monitoring of the CDV-reducing algorithm 31. Upon detection of an algorithm abnormality, the algorithm monitor 32 outputs an alarm. Upon detection of an arrival cell other than periodic cells, the algorithm monitor does not cause self-monitoring of the algorithm, but executes a normal CDV-reducing algorithm operation. The parameter memory 33 stores self-monitoring parameters.

Figure 2:
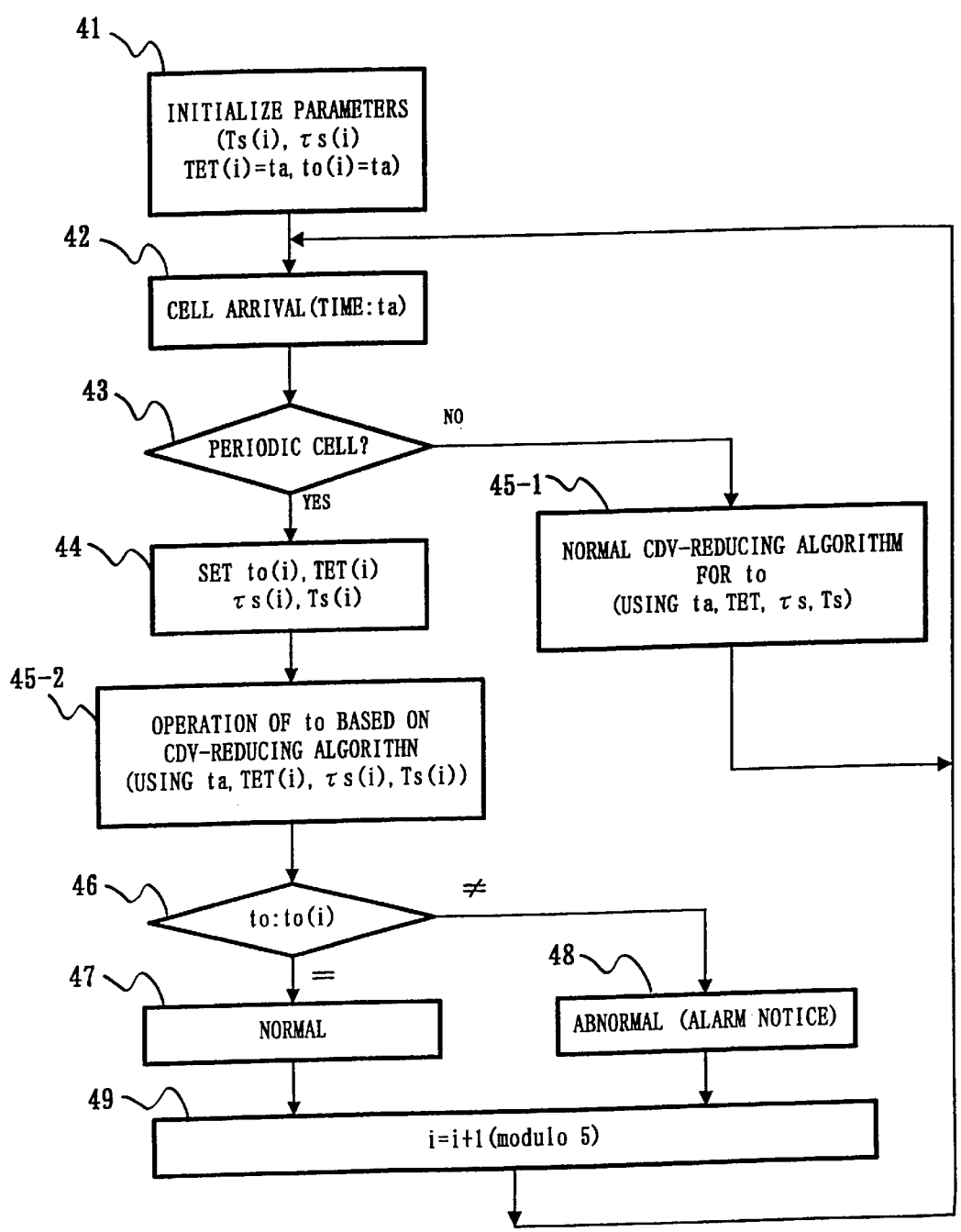
FIG. 2 is a flow chart showing a process in the CDV-reducing algorithm circuit self-monitoring system shown in FIG. 1.

FIG. 2 is a flow chart showing a process in the CDV-reducing algorithm circuit self-monitoring system shown in FIG. 1. In a step 41, the self-monitoring parameters are initialized ($T_s(i)$, $\tau_s(i)$, TET(i)=$t_a$, $t_o(i)=t_a$). When arrival of a cell at time $t_a$ is detected in a step 42, a step 43 is executed, in which a check is made as to whether the arrival cell is a periodic cell.

When the arrival cell is found to be a periodic cell, a step 44 is executed, in which cell arrival time $t_a$, theoretical cell transmission time TET(i), permissible residual CDV $\tau_s(i)$ and minimum inter-cell interval $T_s(i)$ are set. When the arrival cell is found to be other than periodic cells, a step 45-1 is executed, an operation using normal processing parameters is executed on the arrival cell other than periodic cell. Specifically, an operation is executed using the cell arrival time $t_s$, theoretical cell transmission time TET, permissible residual CDV $\tau_s$ and minimum inter-cell interval $T_s$. The routine then goes back to the step 42.

Subsequent to the step 44, a step 45-2 is executed, in which an operation is executed using self-monitoring parameters which have been set at the time of arrival of the periodic cell. Specifically, an operation is executed using the cell arrival time $t_a$, theoretical cell transmission time TET(i), permissible residual CDV $\tau_s(i)$ and minimum inter-cell interval $T_s(i)$. Then, a step 46 is executed.

In the step 46, the result of operation and an estimated value are compared. When the two compared data are equal, it is determined in a step 47 that the algorithm is normal. When it is found as a result of the comparison that the two values are not the same, it is determined in a step 48 that the algorithm is abnormal, and an alarm notification is made. After the step 47 or 48, a step 49 is executed, in which the self-monitoring parameters are updated in modulo 5.

As shown above, a normal policing operation is executed on an arrival cell other than periodic cells, and self-monitoring of the CDV-reducing algorithm is caused when a periodic cell is detected. FIG. 5 shows five different operation patterns #1–#5 of the CDV-reducing algorithm. These operation patterns are, one of shaping in which $t_o$ is set as: $t_o$=TET–$\tau_s$, one in which $t_o$ is set as: $t_o=t_a$ with TET unchanged, one in which $t_o$ is set as: $t_o=t_a$ with new TET, one in which bypass is executed under $t_o>t_s$, and one in which it is updated (i.e., bypassed) to $t_o=t_a$ under $t_o<t_a$ and a self-monitoring pattern $t_o(k)$ (k=0, . . . 4) is defined accordingly. Upon detection of a periodic cell, $t_o(i)$ and predetermined self-monitoring data TET (TET(i)) for k=i are read out to make theoretical value as a CDV-reducing algorithm operation result equal to $t_o(i)$. A CDV-reducing algorithm operation is executed by using TET(i) in lieu of TET at the theoretical periodic cell transmission time. The result $t_o$ of the operation is compared with $t_o(i)$. When the two compared data are equal, it is determined that the CDV-reducing algorithm is normal. Otherwise, it is determined that the CDV-reducing algorithm is abnormal, and an alarm is notified to a function control system.

When the algorithm is found to be abnormal as a result of the self-monitoring, no shaping is executed, and a through (or bypassing) process is executed on all shaping-set input cells.

Figure 3A:
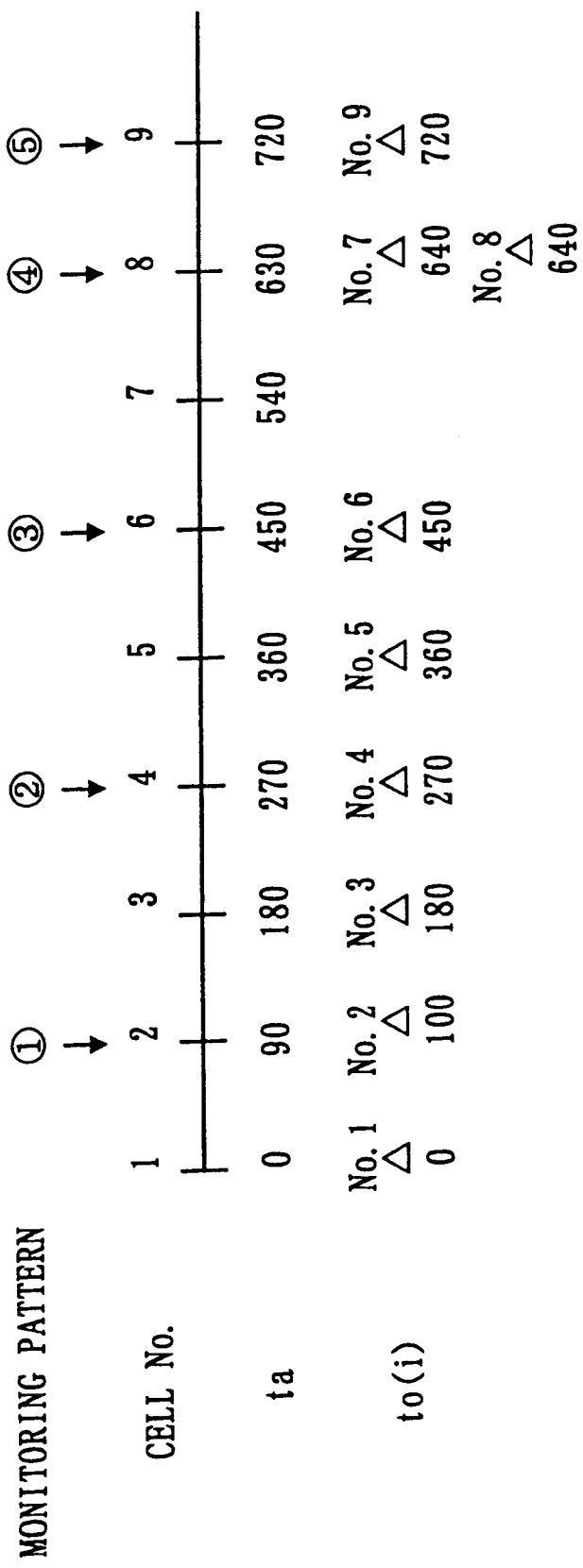
Figure 4:
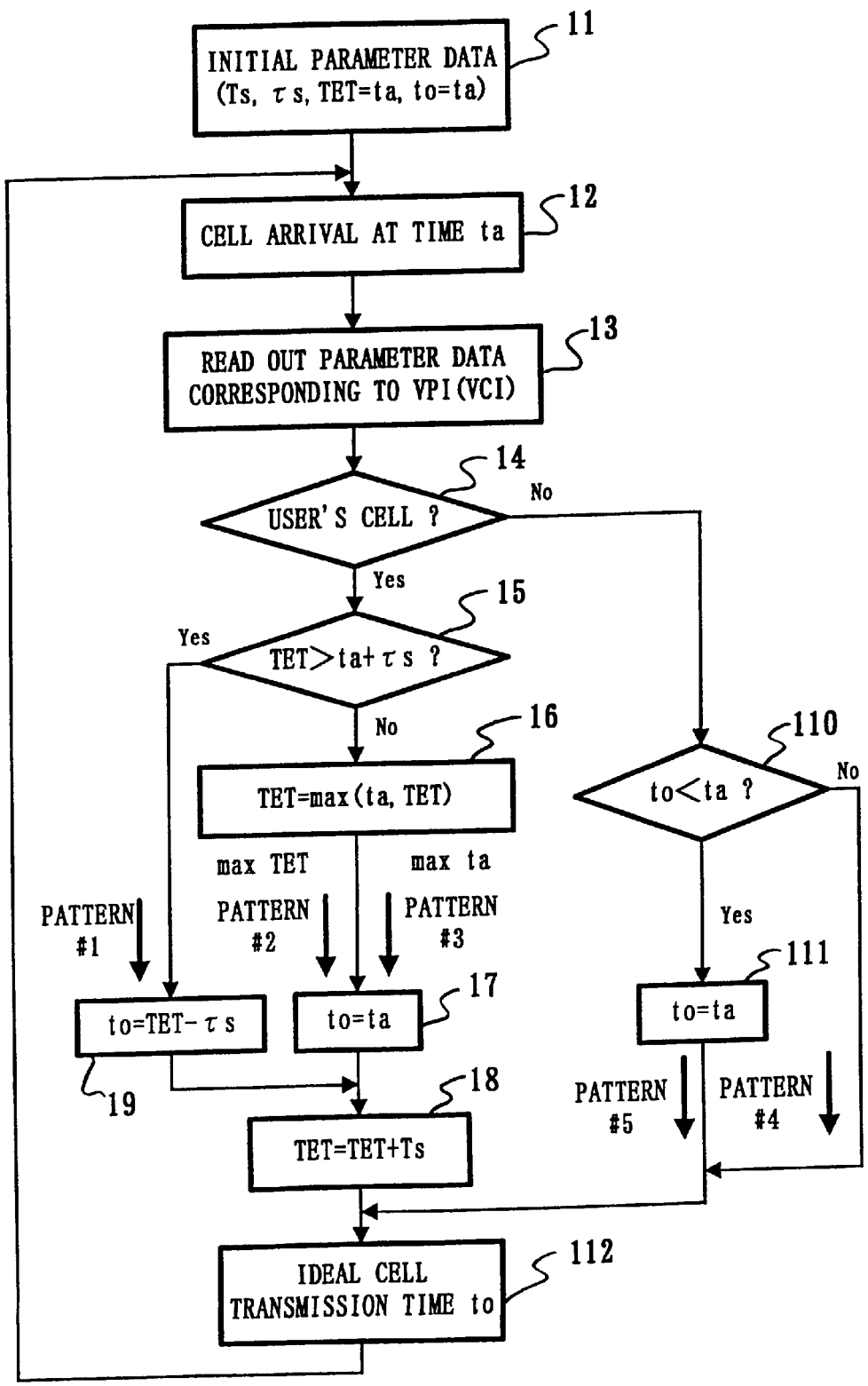
FIG. 4 is a flow chart illustrating a process in a CDV-reducing algorithm circuit.

A specific example of use of predetermined self-monitoring parameter data is shown below. For the periodic cells, an absolute time control method with k=0, . . . 4 as one cycle is proposed. FIGS. 3A–3C shown drawings for explaining an absolute time control method with $t_a$=0, . . . 720 as one cycle. Monitoring parameter data are set as in the bottom table in FIG. 3. Self-monitoring pattern to(k) (k=0, . . . 8) is defined. When a periodic cell is detected, $t_o(i)$ and TET(i) for k=i are read out, and a CDV-reducing algorithm operation is executed by using TET(i) in lieu of the theoretical periodic cell transmission time TET. The result to of the operation is compared with $t_o(i)$. When the next arrival cell is a non-user's cell in the pattern #4, it is necessary to update $t_o(i)$ such that "$t_a<t_o(i)$ in the pattern #4" is always obtained (refer to FIG. 5 for the patterns #1 to #5).

As has been described in the foregoing, according to the invention the CDV-reducing algorithm operation can be self-monitored by utilizing non-data cells (periodic cells) for control, thus permitting the monitoring of the circuit for abnormality without interrupting the shaping operation but in an in-service state of the circuit. In addition, by periodically monitoring the results of operation in the five operation patterns, it is possible to immediately detect abnormality of circuit parts with low operation execution probabilities.

No redundancy need be provided in the circuit, and it is possible to suppress circuit scale increase. In addition, since $t_o(k)$ is monitored periodically in the five operation patterns, it is possible to immediately detect abnormality of even circuit parts with low operation execution probabilities. Moreover, since non-data cells in a cell flow are utilized, the self-monitoring is obtainable in an in-service state of the circuit performing the normal shaping operation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A method for self-monitoring a CDV (cell delay variation)-reduction algorithm circuit, comprising:
    detecting a non-data cell in a cell flow arriving at a predictable time;
    replacing parameters of a CDV-reducing algorithm intended for application to data cells with a predetermined set of self-monitoring parameters which, when executed by the CDV-reducing algorithm on a non-data cell, produces results indicative of an abnormality in the algorithm;
    executing the CDV-reducing algorithm on the detected non-data cell using said predetermined set of self-monitoring parameters;
    comparing a result of CDV-reducing algorithm executed using said predetermined set of self-monitoring parameters with an estimated value;
    determining that the CDV-reducing algorithm is normal when the result of the CDV-reducing algorithm equals the estimated value, and determining that the CDV-reducing algorithm is abnormal when the result of the CDV-reducing algorithm is not equal to the estimated value; and
    sending an alarm to a function control system when the CDV-reducing algorithm is determined to be abnormal in said determining step.

2. A method for self-monitoring a CDV-reducing algorithm circuit according to claim 1, wherein the non-data cell arrives periodically.

3. A method for self-monitoring a CDV-reducing algorithm circuit according to claim 1, further comprising:
    measuring an arrival time instant of the non-data cell based on a predetermined function.

4. A self-monitoring method for a CDV (cell delay variation)-reducing algorithm circuit having a plurality operation parameters comprising: one of shaping in which $t_o$ is set to $t_o=TET-\tau_s$, one is which $t_o$ is set to $t_o=t_a$ with TET unchanged, one in which $t_o$ is set to $t_o=t_a$ with new TET, one in which a bypass is executed under $t_o>t_a$, and one in which an update or a bypass is executed such that $t_o=t_a$ under $t_o<t_a$, where $t_o$ is ideal cell transmission time, $t_a$ is cell arrival time, TET is theoretical next cell transmission time, and $\tau_s$ is permissible residual CDV time, said method comprising the steps:
    defining a self-monitoring pattern $t_o(k)$ (k being 0, . . . 4);
    executing a normal policing operation on an arrival cell other than periodic cells and;
    upon detection of a periodic cell, reading out $t_o(i)$ and a predetermined self-monitoring parameter data TET (TET(i)) for k=i to make a theoretical value as a CDV-reducing algorithm operation result equal to $t_o(i)$;
    executing a CDV-reducing algorithm operation by using TET(i) in lieu of TET at a theoretical periodic cell transmission time;
    comparing an operation result $t_o$ and $t_o(i)$;
    determining, when the two compared data are equal, that the CDV-reducing algorithm is normal, when the two compared data fail to be equal, that the CDV-reducing algorithm is abnormal; and
    sending an alarm to a function control system when said CDV reducing algorithm is abnormal.

5. A CDV (cell delay variation)-reducing algorithm circuit self-monitoring apparatus, comprising:
    means for detecting non-data cells contained in a cell flow arriving at predictable times;
    means for performing a CDV-reducing algorithm operation on each detected non-data cell using self-monitoring parameters;
    means for comparing the result of the CDV-reducing algorithm operation with an estimated value;
    means for determining, when the two compared data are equal, that the CDV-reducing algorithm is normal, and when the two compared data fail to be equal, that the CDV-reducing algorithm is abnormal; and
    means for sending an alarm to a function control system when said CDV-reducing algorithm is abnormal.

6. A method for self-monitoring a CDV-reducing algorithm circuit according to claim 1, wherein said determining steps are performed without interrupting a shaping operation of said circuit.

7. A method for self-monitoring a CDV-reducing algorithm circuit according to claim 1, wherein said determining steps are performed in an in-service state of said circuit.

8. A method for self-monitoring a CDV-reducing algorithm circuit according to claim 1, wherein said non-data cells are periodic cells.

9. A method for self-monitoring a CDV-reducing algorithm circuit according to claim 1, wherein said comparing step includes comparing a result of at least one of a pluralityof CDV-reducing algorithm operation patterns with said estimated value, said patterns corresponding to a shaping pattern, $t_o=t_a$ with unchanged TET, $t_o=t_a$ with new TET, bypass with $t_o>t_a$, and update (bypass) as $t_o=t_a$ with $t_o>t_a$.

10. A method for self-monitoring a CDV-reducing algorithm circuit according to claim 1, wherein said comparing step includes comparing a result of a first ideal transmission time as determined by the CDV-reducing algorithm with a second ideal transmission time as determined by the self-monitoring circuit, and wherein a first theoretical next cell transmission time as determined by the CDV-reducing algorithm is provided as input as a self-monitoring parameter to the algorithm, and
    wherein said determining step includes determining that the CDV-reducing algorithm is normal when the first ideal transmission time and the second ideal transmission time are equal, and determining that the CDV-reducing algorithm is abnormal when the first ideal transmission time and the second ideal transmission time are not equal.

11. A system for self-monitoring a CDV (cell delay variation)-reducing algorithm circuit, comprising:
    means for detecting a non-data cell in a cell flow arriving at a predictable time;
    means for replacing parameters of a CDV-reducing algorithm intended for application to data cells with a predetermined set of self-monitoring parameters which, when executed by the CDV-reducing algorithm on a non-data cell, produces results indicative of an abnormality in the algorithm;

means for executing the CDV-reducing algorithm on the detected non-data cell using said predetermined set of self-monitoring parameters;

means for comparing a result of CDV-reducing algorithm executed using said predetermined set of self-monitoring parameters with an estimated value;

means for determining that the CDV-reducing algorithm is normal when the result of the CDV-reducing algorithm equals the estimated value, and determining that the CDV-reducing algorithm is abnormal when the result of the CDV-reducing algorithm is not equal to the estimated value; and means for sending an alarm to a function control system when the CDV-reducing algorithm is determined to be abnormal in said determining step.

\* \* \* \* \*